Sept. 27, 1938.  F. R. BICHOWSKY  2,131,265
SPIRAL HEAT INTERCHANGER AND METHOD OF MAKING SAME
Filed March 1, 1937   5 Sheets-Sheet 1
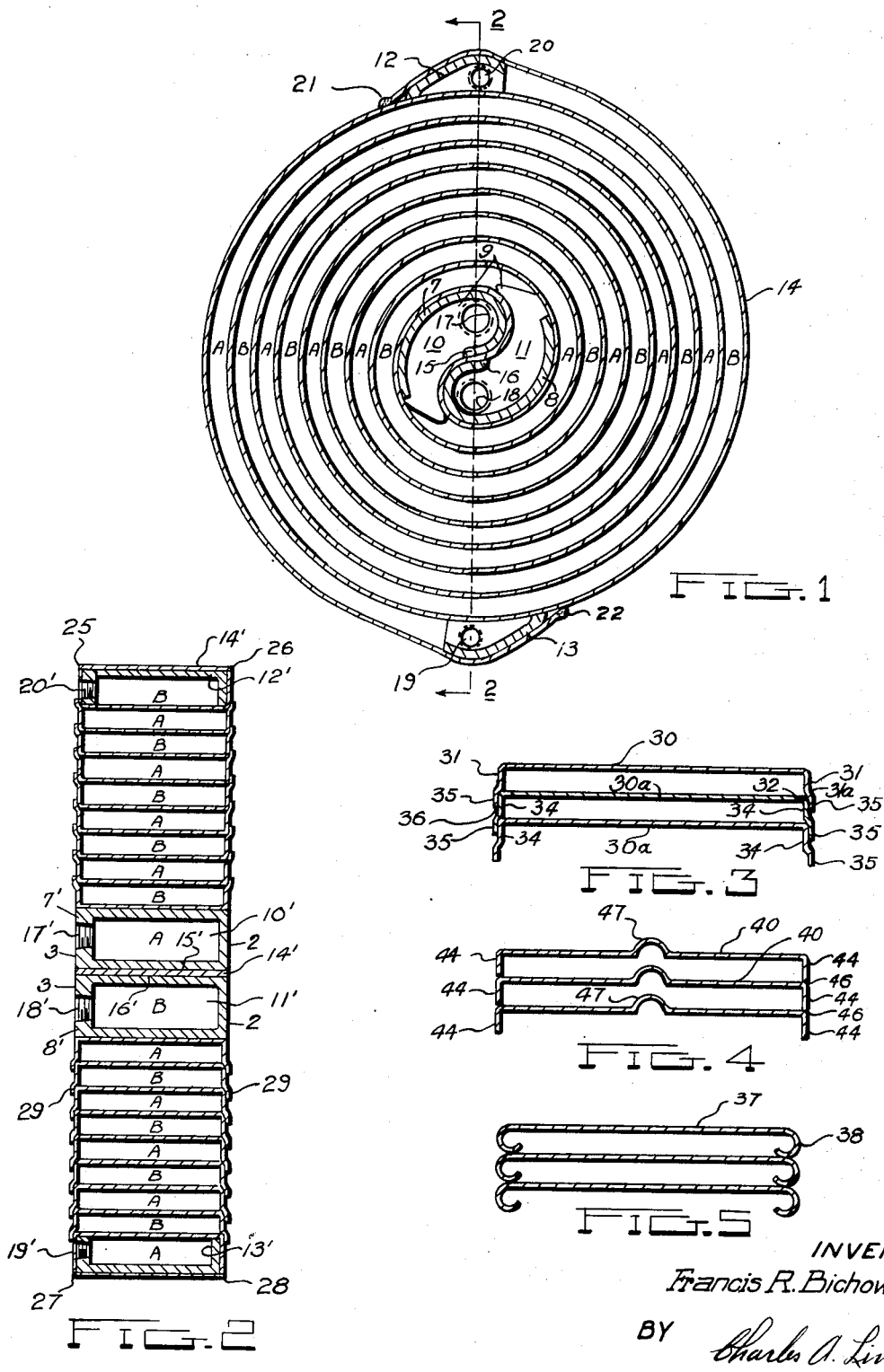
INVENTOR
Francis R. Bichowsky
BY Charles A. Lind
ATTORNEY Sept. 27, 1938.   F. R. BICHOWSKY   2,131,265
SPIRAL HEAT INTERCHANGER AND METHOD OF MAKING SAME
Filed March 1, 1937    5 Sheets-Sheet 2

INVENTOR
Francis R. Bichowsky
BY
Charles A. Lind
ATTORNEY

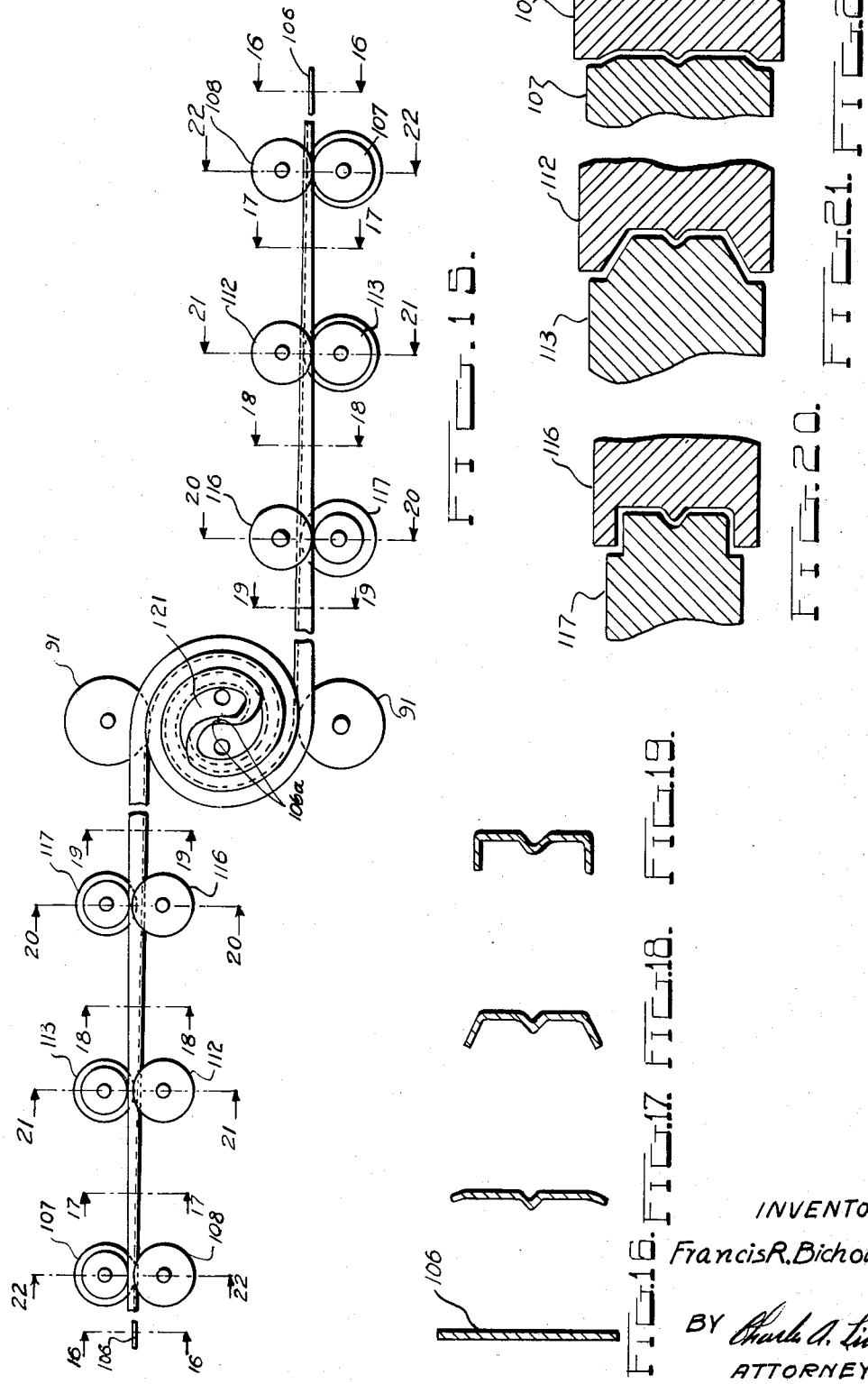

Sept. 27, 1938.    F. R. BICHOWSKY.    2,131,265
SPIRAL HEAT INTERCHANGER AND METHOD OF MAKING SAME
Filed March 1, 1937    5 Sheets-Sheet 4

INVENTOR
Francis R. Bichowsky
BY Charles A. Lind
ATTORNEY

Sept. 27, 1938.    F. R. BICHOWSKY    2,131,265
SPIRAL HEAT INTERCHANGER AND METHOD OF MAKING SAME
Filed March 1, 1937    5 Sheets-Sheet 5

INVENTOR
Francis R. Bichowsky
BY Charles A. Lind
ATTORNEY

Patented Sept. 27, 1938

2,131,265

UNITED STATES PATENT OFFICE 2,131,265

SPIRAL HEAT INTERCHANGER AND METHOD OF MAKING SAME

Francis R. Bichowsky, Toledo, Ohio, assignor to The Dow Chemical Company, Midland, Mich., a corporation of Michigan Application March 1, 1937, Serial No. 128,318

13 Claims. (Cl. 113—118)

This invention relates to heat interchangers and more particularly to a heat interchanger of the spiral type.

Although their efficiency is known to be of a very high degree, spiral heat interchangers have not yet replaced bulkier and less efficient interchangers of other types. The reason therefore resides in certain deficiencies in the construction of the known interchangers of the spiral type, as well as in difficulties in constructing the same, wherefore the cost of the better known constructions proved to be prohibitive in spite of the obvious advantages of the spiral interchangers over the interchangers of other types. The principal difficulty in present day spiral interchangers resides in the failure of the necessarily thin partitions between the spiral passages satisfactorily to withstand the prevailing pressures in said passages. Hence, portions of these partitions eventually break through or at least become permanently distorted and throttle the spiral passages. Difficulties have also been encountered in the endeavor uniformly to space the partitions so as to obtain spiral passages of uniform cross-sectional area, as well as in sealing these passages against leakage therebetween. Determined efforts to overcome these and other difficulties resulted in extremely complicated and costly constructions which do not readily lend themselves to repair or to replacement of parts.

It is, therefore, the primary aim and object of the present invention to provide a spiral heat interchanger which is of simple and durable construction, the manufacturing cost of which is very low, and in which none of the difficulties of the present day constructions are encountered.

It is more particularly an object of the present invention to provide for adequate reinforcement of the thin partitions between the spiral passages of the interchanger.

It is another particular object of the present invention to provide for effective and durable sealing of the spiral passages of the interchanger.

It is also among the objects of the present invention to manufacture the heat interchanger by a minimum number of simple operations. In connection therewith, it is particularly aimed at a simple mode of uniformly spacing the partitions to obtain spiral passages of uniform cross-sectional area.

Further objects and advantages of the present invention will be apparent from the following description, reference being had to the accompanying drawings, wherein a preferred embodiment of one form of the present invention is clearly shown.

In the drawings:

Fig. 1 is a transverse section through a spiral interchanger which embodies the present invention.

Fig. 2 is a cross-section through a spiral interchanger which is similar to that shown in Fig. 1.

Figs. 3 to 10 inclusive, are fragmentary sectional views of sheet stock of various profiles, which is wound up in spiral fashion to form the two separate passages of a spiral heat interchanger.

Figure 11:
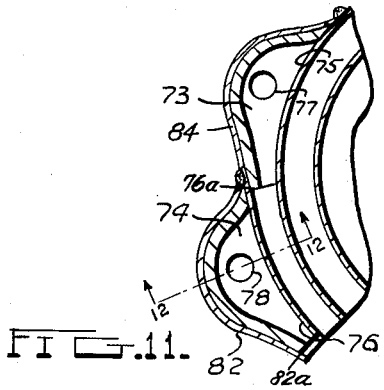

Fig. 11 is a fragmentary transverse section through part of a spiral interchanger, showing more particularly a modified connection of the outer ends of the spiral passages thereof with the outside of the interchanger.

Figure 12:
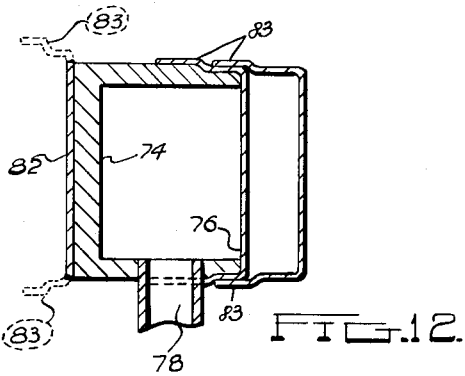

Fig. 12 is a fragmentary section, taken on the line 12—12 of Fig. 11.

Figure 13:
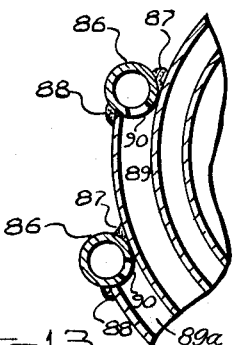

Fig. 13 is a fragmentary transverse section through part of a spiral interchanger, showing another modified connection between the outer ends of the spiral passages and the outside of the interchanger.

Figure 14:
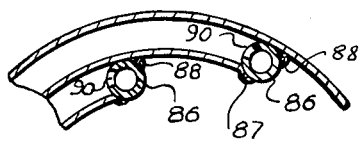

Fig. 14 is a fragmentary transverse section through part of a spiral interchanger, showing a third modified connection between the outer ends of the spiral passages and the outside of the interchanger.

Fig. 15 illustrates a method for profiling sheet stock and for winding the profiled stock into a spiral fluid conductor.

Figs. 16 to 19 inclusive, illustrate progressive steps in the deformation of the sheet stock during the profiling process. More particularly, Figs. 16 to 19 inclusive, are sections through the stock, taken on the lines 16—16, 17—17, 18—18 and 19—19 of Fig. 15.

Figs. 20 to 22 inclusive, are fragmentary sections of pairs of cooperating rolls which are adapted to profile the sheet stock. More particularly, these figures are sections taken on the lines 20—20, 21—21 and 22—22 of Fig. 15.

Figure 23:
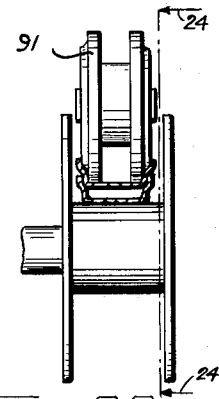

Fig. 23 illustrates a structure whereby the convolutions of the spirally wound stock are tightly packed.

Figure 24:
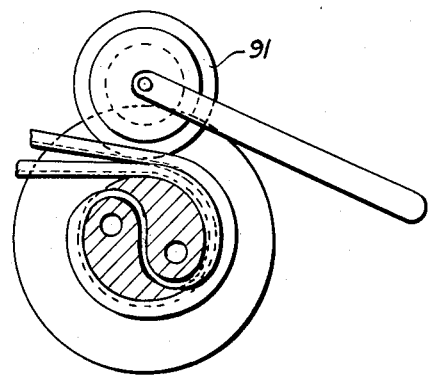

Fig. 24 is a section taken on the line 24—24 of Fig. 23.

Figure 25:
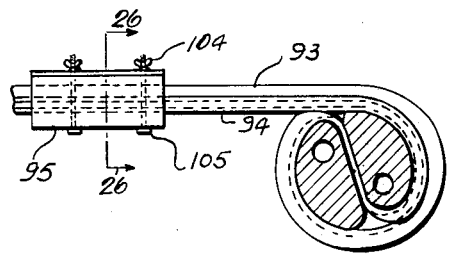

Fig. 25 illustrates a modified structure for packing the convolutions of the spirally wound stock.

Figure 26:
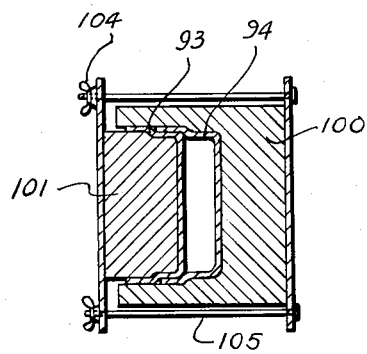

Fig. 26 is an enlarged section taken on the line 26—26 of Fig. 25.

Figure 27:
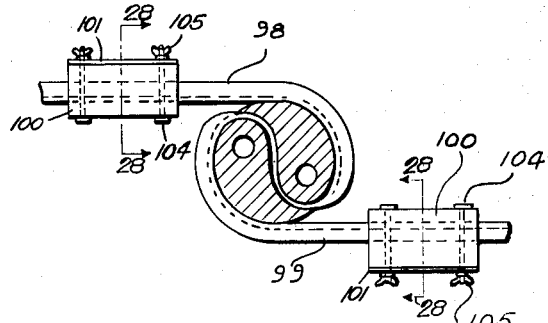

Fig. 27 illustrates another modified structure for packing the convolutions of the spirally wound stock.

Figure 28:
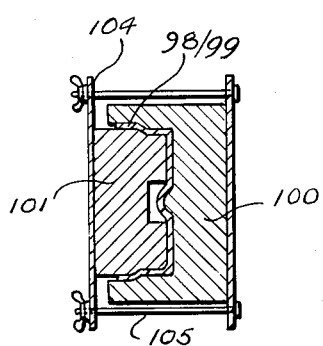

Fig. 28 is an enlarged section taken on either line 28—28 of Fig. 27.

Figure 29:
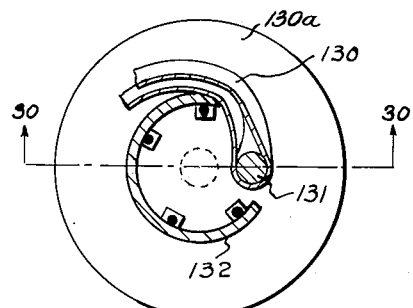

Fig. 29 illustrates certain structure whereon the profiled stock is wound.

Figure 30:
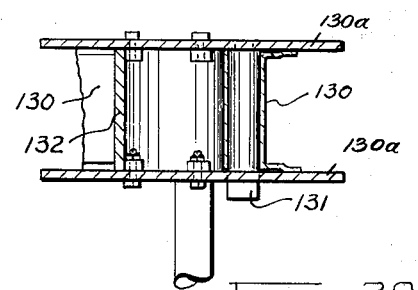

Fig. 30 is a section taken on the line 30—30 of Fig. 29.

Figure 31:
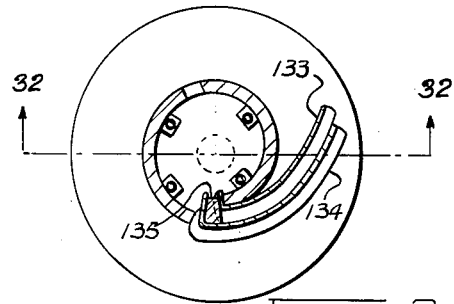

Fig. 31 illustrates a modified structure whereon the profiled stock may be wound.

Figure 32:
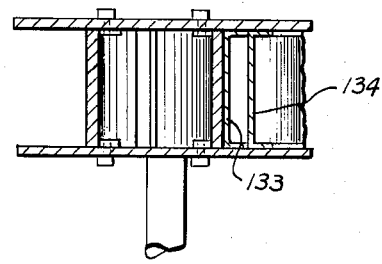

Fig. 32 is a section taken on the line 32—32 of Fig. 31.

Figure 33:
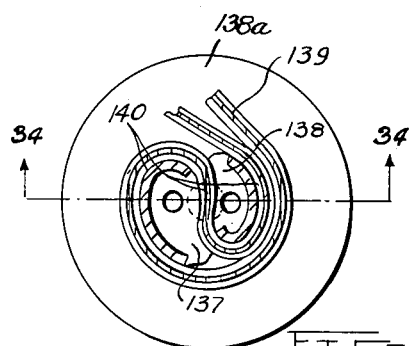

Fig. 33 illustrates another modified structure whereon the profiled stock may be wound.

Figure 34:
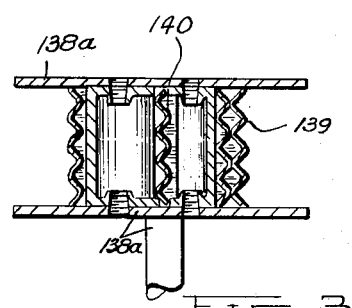

Fig. 34 is a section taken on the line 34—34 of Fig. 33.

Figure 35:
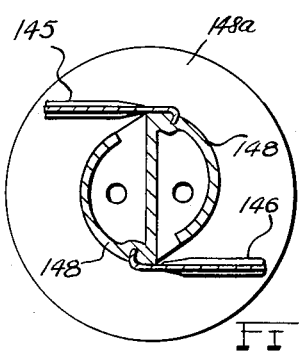

Fig. 35 illustrates a third modified structure whereon the profiled stock may be wound.

The present invention is more particularly directed to a heat interchanger wherein flat sheet stock is so profiled that the spirally wound stock forms at least two spiral passages which are closed except at the inner and outer ends thereof. In order properly to terminate the inner and outer ends of the spiral passages and to connect the same in a desired manner with conventional conduits on the outside of the interchanger, such as pipes, suitable end and central members are provided. The central member or members may be placed into the spirally wound stock, or may serve as a mandrel on which the profiled stock is directly wound into spiral shape. The spiral passages are sealed in any suitable manner, for instance by applying fused metal to abutting or overlapped portions of consecutive convolutions of the spirally wound stock.

Referring to the drawings and more particularly to Fig. 1, there is illustrated one form of construction of a spiral interchanger wherein two spiral passages A and B are formed by a single strip 14 of double-spirally wound sheet stock of the profile illustrated in Fig. 3. A substantially central portion of the strip is looped in form of an S around portions 15 and 16 of a central housing 9 which may consist of two separate halves 7 and 8. The strip 14 forms a partition which divides the central member in two separate chambers 10 and 11. Chamber 10 communicates with the spiral passage A, while chamber 11 communicates with the spiral passage B. Preferably threaded ports 17 and 18 provide communication between the outside of the interchanger and the chambers 10 and 11, respectively. The spiral passages A and B terminate on the outside in end members or end closures 12 and 13, respectively, which are suitably secured to the outermost convolutions of the spirally wound strip 14. These end members provide ready communication between conventional conduits on the outside of the interchanger and the spiral passages A and B through preferably threaded ports 19 and 20, respectively. The end members are preferably castings which may be secured to the outermost convolutions of the spirally wound strip by welding as indicated at 21 and 22.

To obtain two spiral passages by winding a single strip in double-spiral fashion, it is necessary that either flange over substantially one-half the length of the strip extends in a direction opposite to the flange over substantially the other half of the length of the strip. If this requirement were not complied with, two engaging flanges would alternate with two engaging webs of the strip with the result that only one single spiral passage would be obtained.

Fig. 2 discloses substantially the same construction as Fig. 1, except that the flanges of the spirally wound strip project outwardly, i. e., away from the center of the interchanger. The central portion of the interchanger may be constructed in substantially the same manner as that shown in Fig. 1, identical elements being denoted by the same numerals carrying a prime. Fig. 2 also shows the absence of flanges on a central portion of the strip 14' where located between the central members 7' and 8' in order not to interfere with the bottoms and tops 2 and 3, respectively, of these members. The flanges of the strip 14' are also trimmed off where its outermost convolutions engage the end closures 12' and 13' as indicated at 25, 26, 27 and 28. It can be readily observed that the flanges of each convolution of the spirally wound strip 14a overlap the flanges of the next convolution as at 29, thereby spacing consecutive convolutions of the spirally wound strip, readily aligning the convolutions and closing the spiral passages except at the ends thereof.

Fig. 3 shows the profile of the strip which is used in the interchangers of Figs. 1 and 2. This strip has a substantially U-shaped profile, having a web portion 30 and depending flanges 31. The flanges 31 are offset at 31a to provide a longitudinal shoulder 32 which is flanked at both sides by flange portions 34 and 35. When the strip is wound into its double-spiral shape, the web 30a of one convolution comes to rest against the shoulders 32 of the next convolution in the manner illustrated in Fig. 3 on account of the oppositely projecting portions of each flange in substantially the two halves of the strip length. It will also be noted that the flange portions 35 of one convolution are in overlapping engagement with the flange portions 34 of the adjacent convolution. The web portions 30a of successive convolutions are thus spaced apart and the two spiral passages between said web portions closed by the overlapping flanges 31. The spiral passages of the interchanger are suitably sealed, for instance by fused metal applied at 36 to the overlapping flange portions 34 and 35. The simple cross-sectional shape of the strip in Fig. 3 has the advantage that it may be readily formed by rotatable forming rolls, and that the shoulders or offsets 32 in the flanges 31 form effective spacing means for the web 30a of the spirally wound strip. The overlapping flange portions 34, 35 furthermore lend a certain degree of rigidity to the spirally wound strip prior to the permanent joinder of the convolutions thereof by fused metal, thus facilitating the assembly of the interchanger.

Fig. 4 discloses a different cross-section of sheet stock, the web 40 thereof having two depending flanges or legs 44 which space the adjacent convolutions of the spirally wound stock. The convolutions may be permanently joined by appropriate sealing material applied along the seams 46. To reinforce the web 40 against lateral deformation, for instance by uneven fluid pressures in the spiral passages, a longitudinal corrugation or bead 47 is formed substantially centrally of the web. Fig. 5 illustrates another profile of sheet stock, the web 37 of which terminates in substantially semi-cylindrical spacing flanges 38.

A single strip or two strips of the cross-section shown in Figs. 3, 4 and 5 may be used. If a single strip is used, the beforementioned requirement of reversing the direction of projection of each flange substantially midway of its length must be complied with. The same requirement holds true for the reenforcing bead 47 (Fig. 4) when a single strip is used and the beads of the convolutions of the double-spiral are to project in the same direction as illustrated in Fig. 4.

Figure 6:
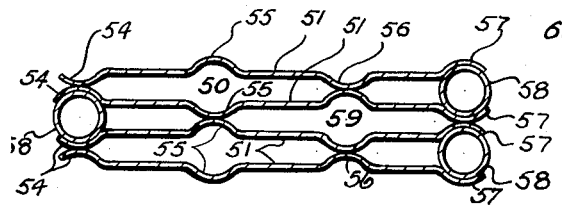

Fig. 6 illustrates another profile of a strip which may be advantageously used in an interchanger. The web 51 of this strip is provided with alternating oppositely extending corrugations or beads 54, 55, 56 and 57. The strip is preferably doubled-back substantially midway of its length and is then wound into spiral shape, whereby the engaging beads 55, 55 and 56, 56 space the convolutions of the spiral strip and form parallel spiral passages 50 and 59, as can be readily understood. These passages are closed by joining the engaging beads 54 and 57 and by joining cylindrical and preferably tubular spacing members 58 to the beads 54 and 57 which partly embrace said members. The members 58 are deposited on the outer bead near one edge of the strip between the two outer beads near the other edge of the strip before the latter is wound and after it is doubled-back. The members 58 serve not only as closure and spacing members, but they also perform the very important function of keeping consecutive convolutions of the strip being wound in perfect alignment. The remaining beads 55 and 56 perform the important functions of reenforcing the spiral web 51 of the wound strip.

Figure 7:
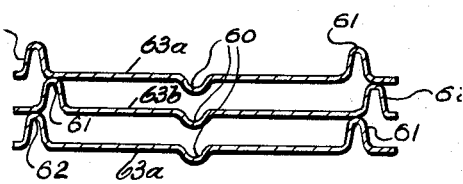

Fig. 7 illustrates another modified profile of sheet stock wound into a spiral interchanger, wherein the beads or corrugations 60 extend in one direction and the remaining corrugations 61 and 62 extend in the opposite direction. Obviously, two separate strips 63a and 63b have to be wound in order to obtain an interchanger of the illustrated cross-section. The strips 63a and 63b may be cut from the same supply strip as their profile is the same; however, one strip must be inverted 180° relative to the other strip so that the corrugation 61 of one strip bears against the web of the other strip, and the corrugation 62 of said other strip bears against the web of said one strip.

Figure 8:
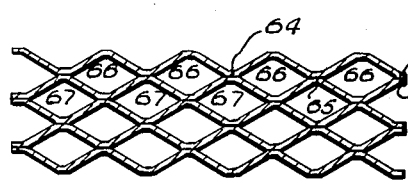

The sheet stock of the cross-section shown fragmentarily in Fig. 8, is corrugated substantially in zig-zag or sawtooth fashion. In this construction, the slightly flattened peaks 64 of one convolution of the strip abut the flattened peaks 65 of the next convolution, thus defining two separate passages 66 and 67 which are divided into numerous sub-passages.

Figure 9:
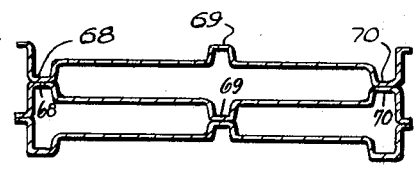
Figure 10:
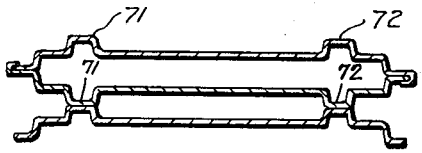

Figs. 9 and 10 illustrate further modified profiles of sheet stock which may be used in an interchanger. The strip in Fig. 9 has corrugations at 68, 69 and 70, while the strip in Fig. 10 has corrugations at 71 and 72. The beads 69 of the stock shown in Fig. 9 divide one of the two spiral passages of the interchanger into two separate chambers, while the beads 71 and 72 of the stock shown in Fig. 10 create two spiral passages of different cross-sectional area.

Other profiles of sheet stock may be used with equal advantage. The present invention is not limited to the disclosed profiles, but includes within its scope any spiral heat interchanger made of one or more flat strips of sheet stock, substantially longitudinal portions of which are deformed in such manner that the deformations will cooperate to space and/or reinforce the convolutions of the spiral conductor to form at least two separate spiral passages.

To terminate the spiral passages, more particularly but not necessarily those formed from sheet stock of the profile illustrated in Fig. 3, Fig. 11 shows end closures 73 and 74 therefor which preferably conform to the profile of the engaging spiral convolutions along their surfaces 75 and 76 and are secured thereto in any suitable manner. The end closures 73 and 74 are preferably castings which are provided with preferably threaded ports 77 and 78, respectively. The flanges 83 of one of the last convolutions 82 have been preferably trimmed off substantially at 82a (Fig. 11) and secured to the adjacent end closure 74. The flanges of the other last convolution 84 have also been preferably trimmed off substantially at 76a and secured to the end closure 73. In Fig. 13 the end closures are in the form of pipes or conduits 86, joined to the outer convolutions of the spiral by soldering or welding as at 87 and 88. These conduits 86 are in communication with the spiral passages 89 and 89a through lateral openings 90. Fig. 14 discloses a construction similar to that of Fig. 13, however, the pipe connections are made interiorly of the last convolutions instead of exteriorly as in Fig. 13.

Fig. 15 illustrates a method of making a spiral interchanger from two separate strips of sheet stock. More particularly, the disclosed method contemplates the profiling of moving sheet stock and the immediate winding of the profiled and moving stock into spiral shape.

The separate strips 106 are passed through pairs of cooperating forming rolls which deform said strips until they assume the desired profile. In passing the strips 106 through the cooperating pairs of forming rolls 107 and 108, 112 and 113, 116 and 117, they are progressively deformed by these rolls in the manner illustrated in Figs. 17 to 19, inclusive. The strips, upon leaving the rolls 116 and 117, have the profile illustrated in Fig. 19. Any suitable mandrel construction 121, which is preferably a central housing that forms a part of the interchanger being made, may be used on which to wind the profiled strips, it being a requirement that both leading ends 106a of the strips 106 be anchored in any suitable manner on said construction 121, as can be readily understood.

In winding the profiled sheet stock, and more particularly that shown in Fig. 3, it is advantageous to use one or more heavy rolls such as the roll 91 in Figs. 23 and 24 in order to pack the convolutions of the spiral tightly and also to force the flanges of consecutive convolutions into overlapping engagement. Instead of using the heavy roller 91 for packing the convolutions of the spiral, recourse can be had to tensioning devices which maintain a portion of the unwound stock next to the wound stock under tension, thereby also packing the convolutions during the winding of the spiral. Figs. 25 and 26 show a stationary tensioning device 95 through which two overlapped strip portions 93 and 94 pass on their way to the mandrel. The members 100 and 101 of this device are forced into frictional engagement with the strip portions by means of bolts 105 and nuts 104. The frictional resistance encountered by these strip portions against movement in the winding direction not only prevents a loosening of the spiral convolutions, but effectively packs the same. If it is desired to tension each strip portion individually, recourse is had to the arrangement disclosed in Figs. 27 and 28, wherein a tensioning device of the type shown in Fig. 26 is provided for each separate strip portion 98 and 99.

Figs. 29 and 30 show a mandrel 132 whereon the doubled-back strip 130 is wound into spiral shape and from which the spiral has to be removed for assembly with a central housing. More particularly, the loop of the strip 130 is anchored on a post 131 which is removably mounted in end plates 130a of the mandrel, and the doubled-back strip 130 is wound on the mandrel proper 132. For removal of the finished spiral, the post 131 is withdrawn and one of the end plates removed from the mandrel proper, whereupon the spiral can be stripped from said mandrel. The spiral conductor may be formed from a single strip as shown in Figs. 29 and 30, or it may be formed from two separate strips. Figs. 31 and 32 illustrate the winding of two separate strips 133 and 134 on a mandrel. In this instance, the leading and inwardly bent end of each strip is secured to the mandrel by means of a removable lock or wedge 135. After the spiral has been wound, the wedge 135 is removed and the spiral stripped from the mandrel, ready for assembly with a central housing.

It has been previously mentioned that it is advantageous to wind the profiled strip or strips on a mandrel which becomes a permanent part of the interchanger and forms the central housing thereof. This practice eliminates such costly operations as removing the spiral from its winding mandrel and assembling the spiral with a central housing. Figs. 33 to 35 inclusive, illustrate mandrel constructions which will become a permanent part of the interchanger. These constructions provide central, ported chambers for the interchanger. In Figs. 33 and 34, two open housings 137 and 138 substantially of the type shown in Figs. 1 and 2 are removably mounted in any suitable manner on a rotary driver 138a, and the doubled-back, profiled strip 139 is looped partly around and partly between the two housings as illustrated at 140, thereby partitioning the open housings to provide two separate chambers, each of which communicates with a spiral passage of the interchanger as well as with the outside of the interchanger. The stock used in this particular instance has the profile illustrated in Fig. 8. After the winding operation is concluded, the housings 137 and 138 with the spiral thereon are removed from the driver 138a, whereupon the convolutions are sealed in any suitable manner and the end closures applied to the spiral. Fig. 35 shows a modification wherein two separate strips 145 and 146 are anchored on a central housing 148 which is removably mounted on a rotary driver 148a for winding the strips on said housing. After the strips have been completely wound, the central housing 148 with the spiral thereon is removed from the driver, and the assembly of central housing and spiral properly sealed in any suitable manner.

It can be understood from the foregoing description that the present invention includes among others the following important features:

The construction of a spiral heat interchanger wherein the spiral passages are formed by spirally wound sheet stock which has such a profile that it can be obtained by simple rolling methods. The profile of the stock is furthermore such that certain portions thereof reinforce and/or space the convolutions of the spirally wound stock and thereby define two separate spiral paths, and that the same or other portions of the stock substantially close the spiral paths except at the ends thereof, thereby obtaining two separate spiral fluid passages. Inasmuch as the passages have to be leakproof with respect to each other and with respect to the outside of the interchanger, it is necessary permanently to seal the spiral passages. This may be accomplished in any conventional manner.

The inexpensive and quick method of winding one or more strips in double-spiral fashion, thereby obtaining two separate spiral passages.

The provision of central and end closures which properly terminate the spiral passages and provide for ready communication with conventional conduits, such as pipes, on the outside of the interchanger.

The provision of a central closure or housing which also serves as a mandrel on which the profiled stock is directly wound.

It can be readily understood from the foregoing that in manufacturing the spiral heat interchanger of the present invention, certain steps in the method of manufacture are absolutely indispensable. These steps, as they will be pointed out hereafter, cannot be replaced by other steps as they are in fact the only steps that will result in the manufacture of the spiral heat interchanger of the present invention. Thus, it is imperative to profile the stock before winding. It is equally imperative to wind the profiled stock in double-spiral fashion. If one strip of profiled sheet stock is used, the same will have to be doubled-back before winding as otherwise only one spiral passage would be obtained. Also, in the case of a single strip which has preformed passage closing and convolution spacing flanges, it is absolutely imperative that substantially one-half the length of either flange extends in a direction opposite to the other half of the length thereof, as otherwise two engaging flanges would alternate with two engaging webs of the spiral convolutions and define one spiral passage only. Substantially the same consideration applies to a reinforcing bead which is formed in a single strip and said single strip is wound in double-spiral fashion into a spiral conductor, and said bead is required to project in one and the same direction throughout the convolutions, i. e. inwardly or outwardly with respect to the center of the spiral conductor.

These specific steps in a method of making a spiral heat interchanger according to the present invention are the only possible steps in obtaining the heat interchanger. It is, therefore, understood that these specific steps constitute an inseparable part of the present invention, and not an independent invention.

While the form of embodiment of the present invention, as herein disclosed, constitutes a preferred form, it is to be understood that other forms might be adopted, all coming within the scope of the claims which follow.

What I claim is:

1. In a heat interchanger, a spiral fluid conductor made of a doubled-back single strip having a central web portion and lateral longitudinal flanges wound in spiral fashion and having the flanges over substantially half the strip length extending outwardly from the web in a direction opposite to that of the flanges on the other half of the strip length, thereby spacing all spirally extending portions of the strip and closing both spiral paths between said strip portions thereby obtaining two separate fluid passages.

2. In a heat interchanger, a spiral fluid conductor made of sheet stock extending in double-spiral fashion and having alternately oppositely extending longitudinal deformations spacing all convolutions of the double-spiral, closing both spiral paths between said convolutions thereby obtaining at least two separate fluid passages, and reinforcing the convolutions against lateral collapse while permitting slight expansion and contraction of the convolutions in a direction parallel to the axis of the double-spiral.

3. In a heat interchanger, a spiral fluid conductor made of sheet stock of substantially U-shaped cross-section and extending in double-spiral fashion, the flanges of the stock being offset at points spaced from the web to provide longitudinal shoulders each flanked on at least one side by a flange portion whereby to permit partial overlapping engagement between the flanges of consecutive convolutions of the double-spiral while the central web portion of one convolution abuts the flange shoulders on an adjacent convolution, thereby spacing the webs thereof and forming two separate spiral fluid passages.

4. In a heat interchanger, a spiral fluid conductor made of centrally and longitudinally beaded sheet stock having a central web and lateral depending side flanges and extending in double-spiral fashion with the flanges of consecutive convolutions in substantially abutting engagement with each other, thereby spacing the web thereof and forming two spiral fluid passages between the convolutions of the double-spiral, and the longitudinal bead reinforcing the spaced web wall portions of the convolutions against lateral collapse.

5. In a heat interchanger, a spiral fluid conductor of strip sheet metal stock having an even number of alternating oppositely projecting concavely appearing beads longitudinally of and including each outer edge of the strip, said strip sheet stock being wound in double spiral fashion, the opposite concavely appearing beads of adjacent convolutions engaging each other in abutting relation, thereby spacing the convolutions of the spiral and forming at least two separate spiral fluid passages.

6. In a heat interchanger, a spiral fluid conductor made of sheet stock having oppositely projecting longitudinal beads substantially at the edges and being wound in double-spiral fashion, said conductor including convolution-spacing members secured to and extending between the opposite concavely appearing beads of the convolutions while the opposite convexly appearing beads of the convolutions engage and are secured to each other, thereby forming two separate spiral fluid passages.

7. In a heat interchanger, a spiral fluid conductor made of sheet stock having alternating oppositely projecting longitudinal beads of such number that the outermost beads project to opposite sides of the stock, said stock being wound in double-spiral fashion and said conductor including convolution-spacing members secured to and extending between the opposite concavely appearing outermost beads of the convolutions while the opposite convexly appearing outermost beads of the convolutions engage and are secured to each other, thereby forming two separate spiral fluid passages.

8. In a heat interchanger, the combination of means providing a chamber having two openings on opposite sides of the chamber; and a spiral fluid conductor made of a single strip of sheet stock doubled back substantially midway of its length and having a central portion thereof extending through said chamber to divide the latter in two separate chambers with one opening each, the remaining strip portions being engaged with each other and together wound in spiral fashion on said means, the strip having longitudinal deformations spacing all spirally extending portions thereof from each other and closing both spiral paths therebetween, thereby obtaining two separate fluid passages, each communicating with a separate chamber through the opening thereof.

9. In a heat interchanger, the combination of two identical housings open at one side and having certain side walls so curved that they substantially interfit when placed side by side in inverted relation to each other; and a spiral fluid conductor made of a single strip of sheet stock and having a central portion thereof extending between the interfitting sides of both housings, the remaining strip portions being engaged with each other and together wound in spiral fashion on said housings, the strip having deformations spacing all spirally extending portions thereof and closing both spiral paths therebetween, thereby obtaining two separate fluid passages, each communicating with a housing through the opening thereof.

10. In a method of making a heat interchanger, the steps of deforming longitudinal portions of a strip of sheet stock substantially at the edges thereof into lateral extensions so that substantially one-half the length of the extension at either edge extends in a direction opposite to substantially the other half of the length of the extension at the same edge, doubling-back the deformed strip substantially midway of its length, and winding the doubled-back strip into a spiral with the extensions engaging and spacing consecutive convolutions, thereby obtaining two separate spiral passages.

11. In a method of making a heat interchanger, the steps of deforming longitudinal portions of a strip of sheet stock substantially at the edges thereof into lateral extensions so that substantially one-half the length of the extension at either edge extends in a direction opposite to substantially the other half of the length of the extension at the same edge, deforming another longitudinal portion of the sheet stock intermediate the edges into a longitudinal corrugation, doubling-back the deformed strip substantially midway of its length, and winding the doubled-back strip into a spiral with the extensions engaging and spacing consecutive convolutions, thereby obtaining two separate spiral passages with reinforced spiral walls.

12. In a method of making a heat interchanger, the steps of deforming longitudinal portions of a strip of sheet stock substantially at the edges thereof into lateral extensions so that substantially one-half the length of the extension at either edge extends in a direction opposite to substantially the other half of the length of the extension at the same edge, corrugating a longitudinal portion of the strip intermediate the edges so that the corrugation in substantially one-half the length of the strip projects in a direction opposite to that of the corrugation in substantially the other half of the length of the strip, doubling-back the deformed and corrugated strip substantially midway of its length, and winding the doubled-back strip into a spiral with the extensions engaging and spacing the convolutions, thereby obtaining two separate spiral passages, the spiral walls of which have corrugations projecting in the same direction.

13. In a heat interchanger, a central housing divided into two halves, and a spiral fluid conductor made of a single strip of double-spirally wound sheet stock of substantially U-shaped profile doubled back substantially midway of its length with its midportion looped substantially in the form of an S around the halves of the housing, the flanges of substantially half the strip length extending outwardly from the central web in a direction opposite to that of the flanges on the other half of the strip, and the doubled back portions of said strip being nested and wound about the housing in double spiral fashion with the flanges spacing adjacent spiral convolutions and forming end closures for two separate fluid passages.

FRANCIS R. BICHOWSKY.